(12) United States Patent
Brouwer et al.

(10) Patent No.: US 7,748,311 B2
(45) Date of Patent: Jul. 6, 2010

(54) APPARATUS FOR PREPARING A CONSUMABLE BEVERAGE WITH A FINE-BUBBLED FOAM LAYER

(75) Inventors: Gustaaf Frans Brouwer, Nijkerk (NL); Antonius Comelis Hubertus van der Pluijm, Eindhoven (NL)

(73) Assignee: Sara Lee/DE N.V. (NL)

( * ) Notice: Subject to any disclaimer, the term of this patent is extended or adjusted under 35 U.S.C. 154(b) by 598 days.

(21) Appl. No.: 11/013,242

(22) Filed: Dec. 13, 2004

(65) Prior Publication Data

US 2005/0189439 A1    Sep. 1, 2005

Related U.S. Application Data

(63) Continuation of application No. PCT/NL03/00427, filed on Jun. 12, 2003.

(30) Foreign Application Priority Data

Jun. 12, 2002    (NL) .................................... 1020833

(51) Int. Cl.
*A47J 31/06* (2006.01)
*A47J 31/40* (2006.01)
(52) U.S. Cl. ....................... 99/295; 99/302 R
(58) Field of Classification Search ........... 99/295, 99/302 R
See application file for complete search history.

(56) References Cited

U.S. PATENT DOCUMENTS

| | | | |
|---|---|---|---|
| 3,320,073 A | 5/1967 | Bixby, Jr. et al. | |
| 3,433,464 A | 3/1969 | Swafford et al. | |
| 4,253,385 A | 3/1981 | Illy | |
| 4,694,740 A | 9/1987 | Daloz et al. | |
| 4,882,982 A * | 11/1989 | Muttoni | 99/295 |
| 5,150,645 A | 9/1992 | Schiettecatte | |
| 5,265,519 A | 11/1993 | Schiettecatte et al. | |
| 5,638,740 A * | 6/1997 | Cai | 99/295 |
| 6,009,792 A * | 1/2000 | Kraan | 99/295 |

(Continued)

FOREIGN PATENT DOCUMENTS

DE    40 37 366 A1    5/1992

(Continued)

*Primary Examiner*—Reginald L Alexander
(74) *Attorney, Agent, or Firm*—Foley & Lardner LLP

(57) ABSTRACT

The invention relates to an apparatus for preparing a consumable beverage with a fine-bubbled foam layer. The invention comprises a beverage unit for dispensing the beverage under pressure and at least one nozzle which is in fluid communication with the beverage unit for supplying the beverage to the nozzle for generating a jet of the beverage by means of the nozzle. The apparatus further comprises a collecting unit into which the jet spouts to obtain the beverage with the fine-bubbled foam layer. The collecting unit comprises a chamber with at least one outflow opening for dispensing the beverage with the fine-bubbled foam layer and a jet impact element included in the chamber with a top which is clear of an inner wall of the chamber. The nozzle and the jet impact element are oriented relative to each other such that the jet spouts against a part of the top of the jet impact element so that the jet, after impact on the jet impact element, forms a mist of the beverage which flows against and/or along the inner wall of the chamber and then leaves the chamber via the at least one outflow opening as the beverage with the fine-bubbled foam layer.

54 Claims, 5 Drawing Sheets

U.S. PATENT DOCUMENTS

| | | |
|---|---|---|
| 6,412,394 B2 * | 7/2002 | Bonanno .................. 99/299 |
| 6,499,689 B1 | 12/2002 | Miyazaki |
| 6,564,697 B2 | 5/2003 | Maxwell et al. |
| 6,769,352 B2 | 8/2004 | de Bruin et al. |
| 6,777,007 B2 | 8/2004 | Cai |
| 6,840,158 B2 | 1/2005 | Cai |
| 2002/0022070 A1 | 2/2002 | Dijs |
| 2004/0107841 A1 | 6/2004 | Cai |
| 2005/0139083 A1 | 6/2005 | Brouwer et al. |
| 2006/0230942 A1 * | 10/2006 | Noordhuis .................. 99/275 |
| 2007/0137493 A1 | 6/2007 | Van Der Meer et al. |

FOREIGN PATENT DOCUMENTS

| | | |
|---|---|---|
| DE | 4213895 | 5/1992 |
| DE | 42 13 895 | 11/1992 |
| DE | 42 13 895 A1 | 11/1992 |
| DE | 44 24 835 A1 | 1/1996 |
| EP | 0148982 | 7/1985 |
| EP | 0 878 158 | 11/1998 |
| EP | 0878158 | 11/1998 |
| EP | 1 210 893 A2 | 6/2002 |
| EP | 1092377 | 9/2005 |
| FR | 2 282 838 | 3/1976 |
| GB | 989996 | 4/1965 |
| NL | 7215523 | 5/1974 |
| NL | 1013270 | 4/2001 |
| WO | WO 89/12416 A2 | 12/1989 |
| WO | 00 16674 | 3/2000 |
| WO | WO 0016674 | 3/2000 |
| WO | WO 01/15582 | 3/2001 |
| WO | WO 2004/056246 A1 | 7/2004 |
| WO | WO 2005/016095 A1 | 2/2005 |
| WO | WO 2005/058109 A1 | 6/2005 |
| WO | WO 2005/063094 A1 | 7/2005 |

* cited by examiner

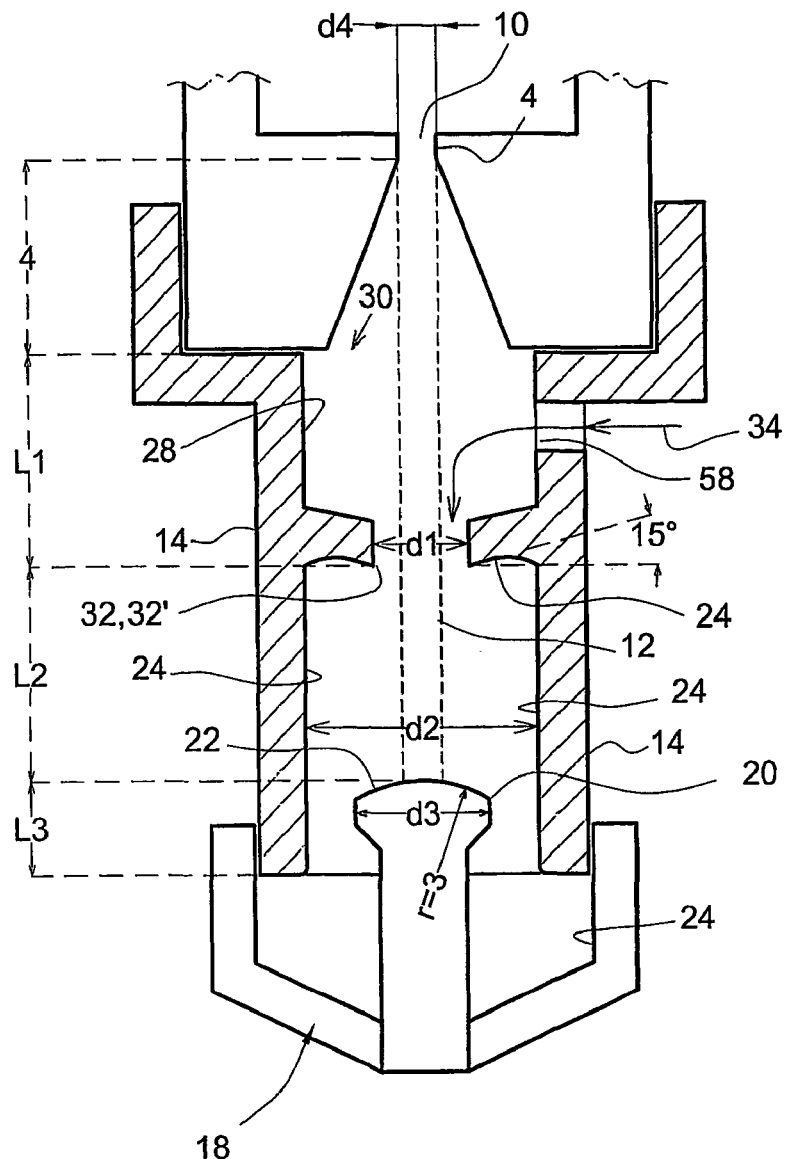
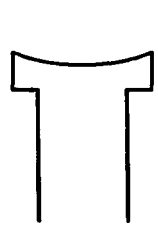
Fig. 5
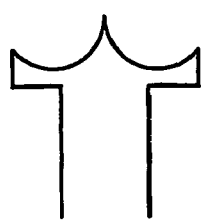
Fig. 6
Fig. 7

APPARATUS FOR PREPARING A CONSUMABLE BEVERAGE WITH A FINE-BUBBLED FOAM LAYER

CROSS REFERENCE TO RELATED APPLICATIONS

This application is a continuation of prior International Application No. PCT/NL03/00427, filed Jun. 12, 2003, which claims priority to The Netherlands Application No. NL1020833 filed on Jun. 12, 2002.

The invention relates to an apparatus for preparing a consumable beverage with a fine-bubbled foam layer, such as coffee or milk with a fine-bubbled foam layer, comprising a beverage unit for dispensing the beverage under pressure and at least one nozzle which is in fluid communication with the beverage unit for supplying the beverage to the nozzle for generating a jet of the beverage by means of the nozzle and a collecting unit into which the jet spouts to obtain the beverage with the fine-bubbled foam layer.

The invention also relates to a method for preparing a consumable beverage with a fine-bubbled foam layer, such as coffee or milk, whereby a liquid jet which comprises the beverage is generated and whereby the liquid jet is supplied to a collecting unit so that the jet spouts into the collecting unit to obtain the beverage with the fine-bubbled foam layer.

The invention further relates to a unit comprising such a collecting unit and a container for receiving a pad which comprises an envelope of filtering paper and which is filled with a product to be extracted, such as ground coffee.

The invention also relates to such a unit and such a pad which is received in the container of the unit.

Such an apparatus and method are known from a possible embodiment of an apparatus of European patent application EP 0 878 158.

In the known apparatus the collecting means comprises a buffer reservoir which, in the example, comprises a bottom with upright side walls. In use, the jet spouts into the buffer reservoir which is thus filled with the beverage to be processed. Thus is formed a liquid surface in the buffer reservoir. The liquid jet hereby spouts into the liquid surface whereby air is beaten into the beverage so that a fine-bubbled foam layer is formed. The buffer reservoir further comprises a run-out path for discharging from the buffer reservoir the beverage with the fine-bubbled foam layer.

After some time the spouting of the beverage into the buffer reservoir stops. The buffer reservoir will, in this example, then empty. The buffer reservoir may, to this end, be provided with an specifically arranged outflow opening in the bottom of the buffer reservoir.

Although in the known system a desired quality of beverage with a fine-bubbled foam layer is formed, it is a drawback that it takes some time before the buffer reservoir has completely emptied. Particularly the associated dripping after may take a relatively long time. When, for instance with the known apparatus and according to the known method, one cup of coffee is prepared, the emptying of the buffer reservoir and the dripping after may take half a minute. The dripping after itself may take 20 seconds. Moreover, the known system has considerable dimensions.

The invention contemplates providing an apparatus and a method with which the signaled problem can be met, if so desired.

The apparatus according to the invention is accordingly characterized in that the collecting unit comprises a chamber with at least one outflow opening for dispensing the beverage with the fine-bubbled foam layer and a jet impact element included in the chamber with a top which is clear of an inner wall of the chamber whereby the nozzle and the jet impact element are oriented relative to each other such that the jet spouts against at least a part of the top of the jet impact element, whereby the beverage, after impact on the jet impact element, leaves the chamber via the at least one outflow opening as the beverage with the fine-bubbled foam layer. Surprisingly, it is found that in the chamber air is beaten into the beverage.

Because in the apparatus according to the invention no liquid level needs to be built up in the chamber, this chamber can, after the spouting of the jet into the chamber has stopped, empty relatively rapidly, if so desired, whereby the dripping after will be relatively short. For the relatively short dripping after it is only necessary that the at least one outflow opening of the chamber is sufficiently large. As this outflow opening has no functional meaning, this opening may be sufficiently large, if so desired, to shorten the dripping after. Also, such an apparatus may be made relatively small.

In particular it holds that the chamber is further provided with at least one air supply opening so as to be able to efficiently supply air to the chamber. Preferably, it holds that the top of the jet impact element is positioned between the air supply opening and the at least one outflow opening. It further particularly holds that the top is directed at least practically toward the nozzle. The impact of the jet against the top may thus be relatively strong so that the beverage, after the impact, is very finely atomized. In particular, it holds that the chamber is further provided with a product supply opening for supplying the jet to the chamber. In this connection, it preferably holds that the top of the jet impact element is positioned between the product supply opening and the outflow opening. Preferably, it further holds that the top is directed at least practically toward the product supply opening. In particular, it further holds that the air supply opening and the product supply opening coincide. The air supply thus prevents the mist particles from being able to move so close to the nozzle that these particles disturb the jet.

In particular, it holds that a surface of the top is made convex or flat. It is found that if the surface of the top is convex a mist of droplets is obtained which, as regards their diameter, is very homogeneous. It is found that this is conducive to obtaining a homogeneous fine-bubbled foam layer.

Preferably, it holds that a normal from the surface of the top and the position where the jet impacts on the top is directed at least practically parallel to the jet. The jet will thus impact on the surface perpendicularly so that the interaction between jet and surface is greatest. In other words, the velocity component of the jet in the direction of the normal is equal to the velocity of the jet itself and hence maximal.

The method according to the invention is characterized in that the collecting unit comprises a chamber with at least one outflow opening for dispensing the beverage with the fine-bubbled foam layer and a jet impact element included in the chamber with a top which is clear of an inner wall of the chamber whereby the jet is directed such that the jet spouts against a part of the top of the jet impact element whereby the beverage, after impact on the jet impact element, then leaves the chamber via the at least one outflow opening as the beverage with the fine-bubbled foam layer.

The unit according to the invention comprises such a collecting unit, a nozzle and a container for receiving a pad which comprises an envelope of filtering paper and which is filled with a product to be extracted, such as ground coffee, whereby the container and the collecting unit are mechanically connected with each other and whereby the container comprises at least one outlet which is in fluid communication with an inlet of the nozzle.

The assembly according to the invention comprises such a unit and a pad which comprises an envelope of filtering paper and which is filled with a product to be extracted, such as ground coffee, whereby the pad is received in the container and extends over a bottom of the container to upright side walls of the container.

The invention will now be explained in greater detail with reference to the drawing.

In this drawing:

FIG. 3b shows a bottom view of the apparatus of FIG. 3a;

FIG. 4b shows a bottom view of a bottom side of the apparatus of FIG. 4a;

FIG. 5 shows a first alternative embodiment of a jet impact element which can be used in the apparatuses of FIGS. 1, 2 and 7;

FIG. 6 shows a second alternative embodiment of a jet impact element which can be used in the apparatuses of FIGS. 1, 2 and 7;

FIG. 7 shows a third embodiment of an apparatus according to the invention for preparing a consumable beverage with a fine-bubbled foam layer;

FIG. 8b shows a cross-section of the nozzle of FIG. 8a.

Figure 1:
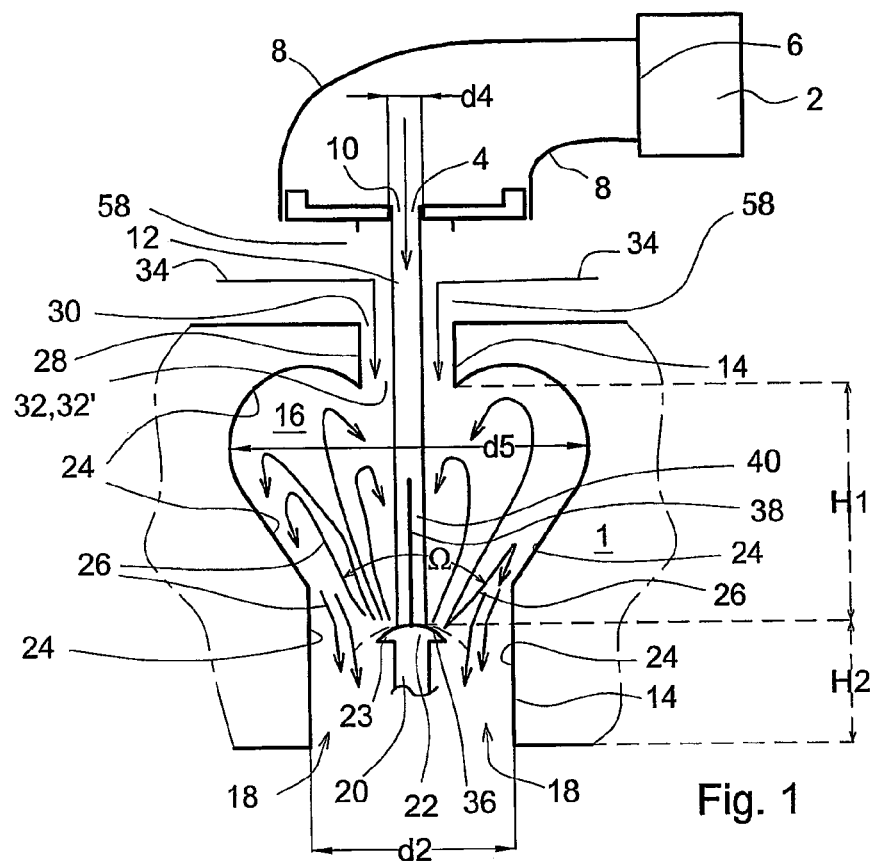
FIG. 1 shows a first embodiment of an apparatus according to the invention for preparing a consumable beverage with a fine-bubbled foam layer.

In FIG. 1 reference numeral 1 denotes an apparatus for preparing a consumable beverage with a fine-bubbled foam layer, such as coffee or milk with a fine-bubbled foam layer. The apparatus 1 comprises a beverage unit 2 for dispensing a consumable beverage under pressure, in this example coffee. The apparatus 1 is further provided with a nozzle 4. An outlet 6 of the beverage unit 2 is connected by means of a hose 8 with an inlet 10 of the nozzle 4. The nozzle 4 is thus in fluid communication with the beverage unit 2 for supplying the beverage to the nozzle 4. Thus is generated by means of the nozzle 4 a jet 12 of the beverage. The apparatus 1 further comprises a collecting unit 14 into which the jet 12 spouts to obtain the beverage with a fine-bubbled foam layer. The collecting unit 14 comprises a chamber 16 which is provided with at least one outflow opening 18 for dispensing the beverage with the fine-bubbled foam layer. The collecting unit 14 further comprises a jet impact element 20 included in the chamber 16. The jet impact element 20 is provided with a top 22 which is clear of an inner wall 24 of the chamber. The nozzle 4 and the jet impact element 20 are oriented relative to each other such that the jet 12 spouts against at least a part of the top 22 of the jet impact element 20 whereby the beverage, after impact on the jet impact element, leaves the chamber via the at least one outflow opening as the beverage with the fine-bubbled foam layer. Surprisingly, in the chamber 16 air has been beaten into the beverage and this in such a manner that a beverage with a fine-bubbled foam layer is obtained.

In this example, on impact against the top 22 of the jet impact element 20 the jet 12 will form a mist and/or turbulence of beverage which flows against and/or along the inner wall 24 of the chamber 16 and then leaves the chamber via the outflow opening 18 as the beverage with the fine-bubbled foam layer. That on impact against the top 22 the jet forms a mist and/or turbulence of beverage which flows against and/or along the inner wall 24 of the chamber 16 has been obtained by adjusting the strength of the jet and the size of the chamber to each other. The jet should be sufficiently strong and/or the chamber should be sufficiently small.

As soon as the beverage unit 2 stops dispensing the beverage to the nozzle 4 under pressure, the forming of a mist of the beverage in the chamber 16 is stopped. The chamber 16 will then be able to empty rapidly via the outflow opening 18. In this example the outflow opening 18 has a diameter of 5 mm, as a result of which the chamber 16 is empty within a few seconds. Prolonged emptying (for tenths of seconds) of the chamber 16 including dripping after is out of the question here.

In this example, the collecting unit 14 comprises a channel 28 with an inlet opening 30 and an outflow opening 32. The outlet opening 32 forms, in this example, a product supply opening of the chamber 16 for supplying the jet 12 to the chamber 16. The nozzle is positioned, in this example, at some distance from the inlet opening 30 of the channel 28. As a result, air 34 is, in use, also drawn by the jet 12 into the chamber 16 via the inlet opening 30 of the channel 28. The product supply opening 32 of the chamber 16 hereby also functions as an air supply opening 32'.

Because a combination of the jet of beverage and air is supplied to the chamber 16, air, in combination with the generated stream of mist particles, can be beaten into the beverage whereby, surprisingly, a beverage with a fine-bubbled foam layer is obtained. Through the air stream from the inlet opening 30 into the chamber 16 it is ensured that the mist particles cannot leave the chamber 16 via the inlet opening 30. The air stream provides, as it were, a sealing of the inlet opening 30 from mist particles in the chamber 16. The mist particles are therefore prevented from moving to the nozzle 4 and disturbing the jet. In use, the mist particles are formed through impact of the jet 12 against a part of the top 22. First, these mist particles will move up and sideward directly after impact against the top 22. Thus is formed a laminar and/or turbulent stream of mist particles in the chamber, which mist particles can further flow against and/or along the inner wall 24. As a result of gravity the mist particles will then flow down again. Subsequently, the mist particles form a liquid beverage again whereby air is beaten into the beverage such that a fine-bubbled foam layer is formed, which beverage can then leave the chamber 16 via the outflow opening 18. The beverage is then ready for consumption.

In this example it holds that the top 22 of the jet impact element 20 is positioned between the air supply opening 32' and the outflow opening 18. It further holds that the top 22 is directed toward the nozzle 4. In this example it also holds that the top 22 is positioned between the product supply opening 32 and the outflow opening 18. In particular, it hereby holds that the top 22 is directed toward the product supply opening 32. In this example it holds that a surface of the top 22 is made convex. It is found that in that case, in the first instance, the mist particles formed after impact move up while spread over a space angle $\Omega$.

In this example it holds that a normal 38 from the surface 36 of the top 22 at a position where the jet 12 impacts on the top 22 is directed at least practically parallel to the jet 12. It further holds that a normal 38 at the middle of the surface 36 of the top 22 is directed at least practically to the nozzle 4. Moreover, it holds that a normal 38 from the surface 36 of the top 22 at the position where the jet 12 impacts is directed to the product supply opening 32. It further holds that the top 22 is positioned in a middle of the chamber 16. In this example, the inner wall 24 of the chamber 16 is made at least practically rotation symmetrical about a rotation symmetrical axis 40. The mentioned middle is, in this example, a point of this rotation symmetrical axis 40. In this example, the jet impact element 20 is positioned in a lower part of the chamber 16. The jet impact element 20 is, in this example, made pole-shaped. An axial direction of the pole-shaped element extends in a longitudinal direction of the chamber 16. The above-mentioned rotation symmetrical axis 40 extends through the top 22. In this example, about the rotation symmetrical axis 40 there is thus obtained a rotation symmetrical collecting unit 14.

In this example, the distance H1 from the product supply opening 32 to the top 22 is greater than the distance H2 from the top 22 to the outflow opening 18 of the chamber 16. In this example, it also holds that H2 is greater than zero. Because the mist stream is particularly formed in the chamber 16 between the top 22 and the product supply opening 32, a large part of the chamber 16 can thus be utilized for the mentioned lamination and/or turbulent streams of the mist.

In FIG. 1 it holds that a cross-section of the chamber 16 is made substantially heart-shaped, but this is not essential. This is, for instance, visible in FIG. 2.

Figure 2:
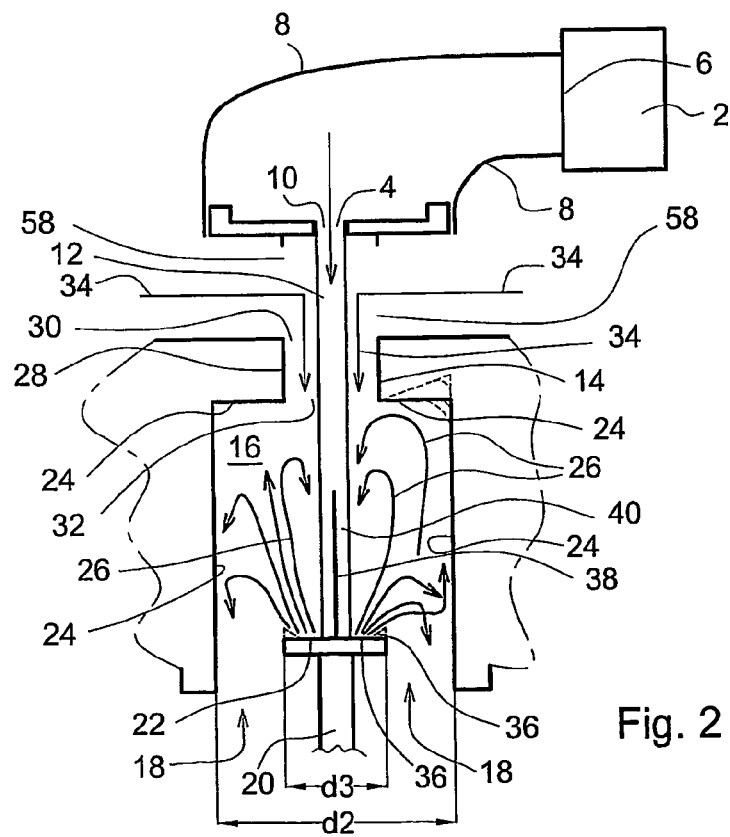
FIG. 2 shows a second embodiment of an apparatus according to the invention for preparing a consumable beverage with a fine-bubbled foam layer.

In FIG. 2 parts corresponding to FIG. 1 are provided with the same reference numerals. In FIG. 2 it now holds that an inner wall 24 of the chamber 16 is made at least substantially cylindrical. It further holds that, in this example, the surface 36 of the top 22 is flat.

Figure 3A:
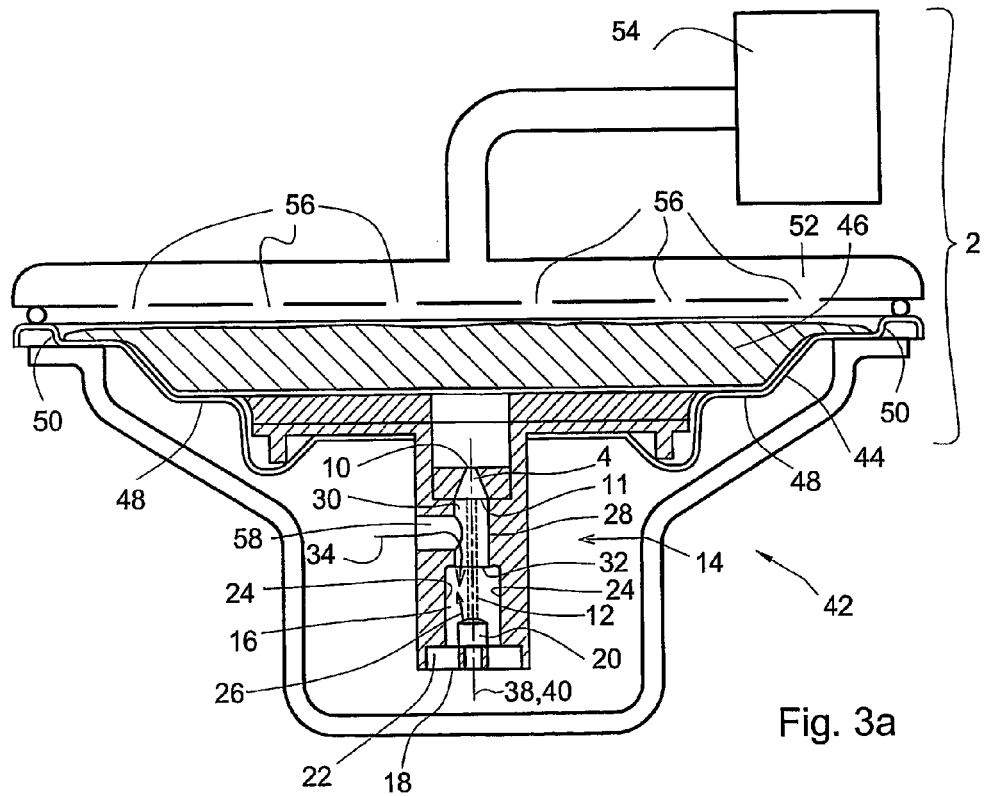
FIG. 3a shows a third embodiment of an apparatus according to the invention, a unit according to the invention which comprises a container, a nozzle and a collecting unit, as well as an assembly according to the invention which comprises a unit whereby a pad is received in the container of the unit.
Figure 3B:
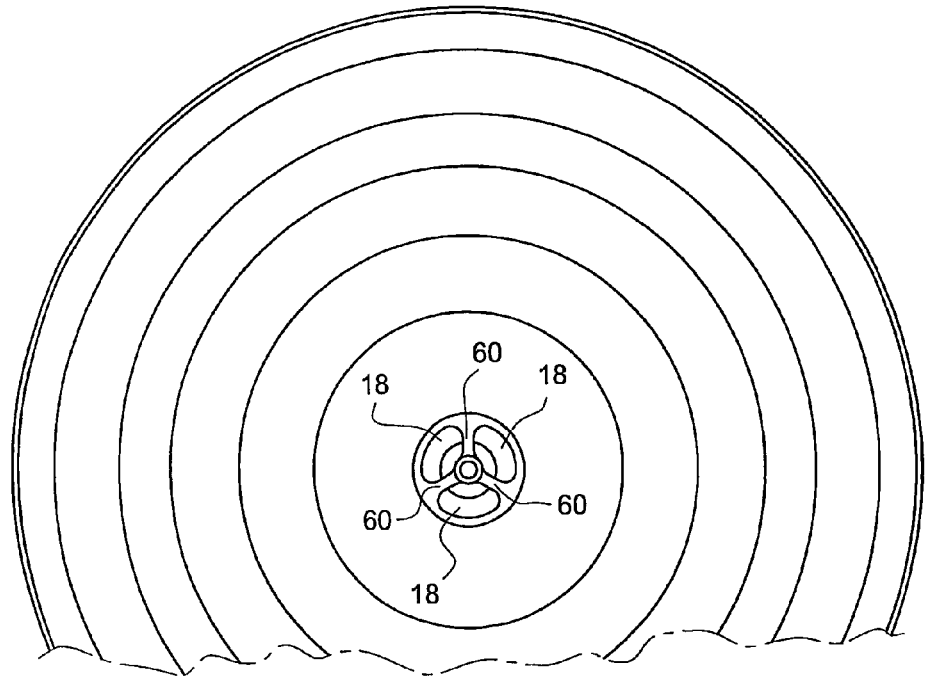

In FIG. 3 is shown an alternative embodiment of an apparatus according to the invention. The apparatus comprises a unit 42 which is provided with a collecting unit 14. Parts of the collecting unit 14 corresponding to FIGS. 1 and 2 are provided with the same reference numerals as in FIGS. 1 and 2. The unit 42 further comprises the nozzle 4. Besides, the unit 42 comprises a container 44 for receiving a pad 46 which is filled with a product to be extracted, such as ground coffee. The container 44 and the pad 46 may be of a type as described in European patent 0 904 717. The container 44 is provided with a cup-shaped bottom 48 which is bounded by an upright side wall 50. The upright side wall extends around the bottom. The bottom and the upright side wall thus bound a cup-shaped inner space of the container in which, in use, the pad is received. The pad 46 extends over the bottom 48 to the upright side wall 50. In the bottom 48 is provided an outflow opening which, in this example, is formed by the nozzle 4. This outflow opening forms an outlet of the container. In this example, the inlet 10 of the nozzle is also in fluid communication with the outlet of the container, because the inlet 10 and an outlet 11 of the nozzle form the outlet of the container. Also, grooves are provided in the bottom of the container. The apparatus 1 further comprises a cover 52 with which the container can be closed. The apparatus 1 further comprises a hot water unit 54 for supplying hot water under pressure to an inner space of the cover 52. The cover 52 is provided at its bottom side with a number of outflow openings 56. In use, hot water is thus supplied via the outflow openings 56 to a top side of the container 44. The container 44 and the hot water unit 54 form, in combination, the beverage unit 2 of FIGS. 1 and 2. In this example, it further holds that the collecting unit 14 and the container 44 are mechanically connected with each other. In this example, it further holds that the nozzle 4 is mechanically connected with the container 44. The nozzle 4, the container 44 and the collecting unit 14 thus form a mechanical unit. In this example, it holds that in the channel 28 an air inflow opening 58 is provided. The air inflow opening 58 is positioned between the nozzle 4 and the top 22 of the jet impact element 20. The air flows again via the product supply opening 32 into the chamber 16. The product supply opening therefore also functions as an air supply opening 32' of the chamber 16. The jet impact element 20 is, in this example, connected with the chamber 16 by means of three cross arms 60.

The pad 46 extends over the bottom 48 of the container 44 to the upright side walls 50 of the container. The assembly of pad 46 and unit 42 also forms a part of the invention.

The apparatus of FIG. 3 operates as follows. By means of the hot water unit 54 hot water is supplied under pressure to the inner space of the cover 52. This hot water leaves the cover 52 under pressure via the outflow openings 56 of the cover 52. Hot water is thus supplied to the top side of the container 44. This water is pressed through the pad 46 which, in this example, is filled with ground coffee. There is thus formed a coffee extract which leaves the container 44 via the nozzle 4. Because the coffee extract is supplied to the nozzle 4 under pressure, a jet of the beverage is thus formed. This jet 12 impacts on top of the top 22 of the jet impact element 20, as discussed in relation to FIGS. 1 and 2. The beverage with the fine-bubbled foam layer, in this example the coffee extract with the fine-bubbled foam layer, leaves the chamber 16 via the outflow opening 18. In this example, the outflow opening 18 is formed by the openings which are formed between the cross arms 60.

Figure 4A:
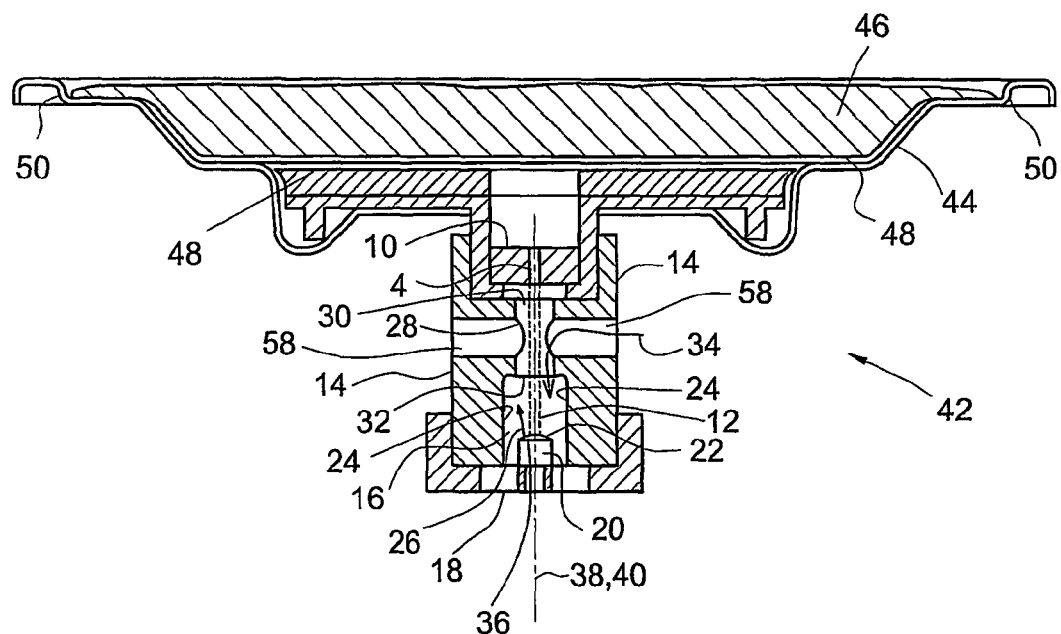
FIG. 4a shows a fourth embodiment of an apparatus according to the invention, a unit according to the invention and an assembly according to the invention.
Figure 4B:
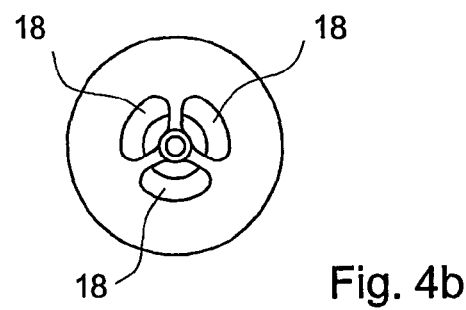

Finally, FIG. 4 shows an assembly according to the invention which comprises a unit 42 according to the invention and a pad 46. The unit 42 according to the invention is again provided with a container 44, as discussed in relation to FIG. 3. A difference with FIG. 3 is that the apparatus 1 is now provided with two air supply openings 58.1 and 58.2 which also discharge into the channel 28.

The invention is by no means limited to the above-described exemplary embodiments, Thus, the air inflow openings may discharge not only into the channel, but also into the chamber 16 itself. This may, for instance, occur near a top side of the chamber 16. However, other places within the chamber 16 are also conceivable.

It is also conceivable that instead of a jet a multiplicity of jets impact on the jet impact element 20. In this connection, a multiplicity of nozzles 4 may be used which each direct a jet to the jet impact element 20. Besides, it is possible that the nozzle 4 is provided with a multiplicity of outlets for generating a multiplicity of jets. The multiplicity of jets may also impact on a multiplicity of jet elements which are included in the chamber 16. It is also conceivable that the chamber is provided with a multiplicity of jet impact elements 20 which are each impacted by at least one jet originating from, for instance, a multiplicity of nozzles. In the apparatus of FIGS. 3 and 4 it is also possible that between the outlet of the container and the inlet of the nozzle a fluid connection is present in the form of, for instance, a hose. The jet impact element may, as stated, have the form of a flat plate. Also, the top 22 may be made convex, as shown in FIG. 1, whereby near an edge 23 holes extending from above to below the top 22 are provided. The top 22 may also be made concave (see FIG. 5). Besides, the top 22 may be made concave over the outer circumference with a point in the middle (see FIG. 6). The collecting unit 14 may also be made as shown in FIG. 7.

Moreover, for instance in the apparatus of FIGS. 1-4, 7, the jet impact element may be replaced by a cylinder or tube which, in the drawing, extends in the horizontal direction between the walls 24 of the chamber. The part of an outer side of the cylinder or tube on which the jet may impact then forms the top of the jet impact element which is clear of the walls 24. The diameter of the cylinder or tube may, for instance, be equal to the diameter of the top in FIGS. 1-7.

Figure 8A:
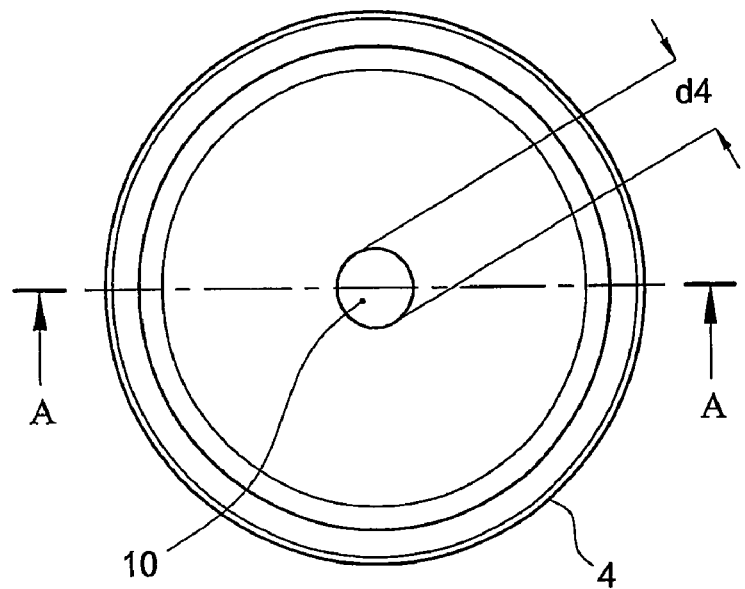
FIG. 8a shows a top view of a possible embodiment of a nozzle.
Figure 8B:
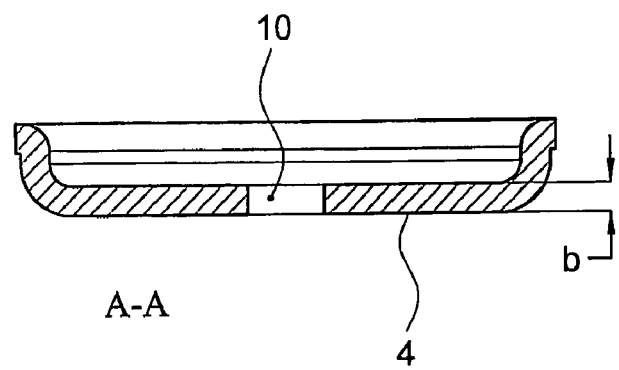

The nozzle may, for instance, also be formed by a nozzle as described in EP 1 092 377. Besides, the nozzle may be formed by a plate 100 with an opening 102 as shown in FIGS. 8a and 8b. The thickness b of the plate is, for instance, 0.1-0.5 mm, preferably 0.2-0.4 mm.

In FIG. 7 it holds, for instance, that $d1<d3$.

Moreover, for each embodiment it holds that $d3<d2$ (see, for instance, FIGS. 2 and 7). In general, the following further holds.

The diameter of the jet when leaving the nozzle may, for instance, vary from 0.2-1.6 mm, more in particular from 0.4-1.4 mm, preferably from 0.6-1 mm and more preferably 0.7-0.9 mm. In this example, this diameter is approximately 0.8 mm.

The diameter of the top (for instance d3 in FIG. 7) may, for instance, vary from 1.4-10 mm, more in particular from 1.5-8 mm, preferably from 1.75-5 mm and more preferably from 1.75-3.0 mm. In this example, this diameter is 2 mm.

The diameter of the chamber at the top (see, for instance, d2 in FIGS. 2 and 7) divided by the diameter of the top (see, for instance, d3 in FIGS. 2 and 7) is, for instance, greater than 1.1, preferably greater than 1.2 and more preferably greater than 2.0. The mentioned ratio is preferably approximately equal to 2.5.

It further holds, for instance for this ratio, that this is, for instance, smaller than 5. It also holds, for instance for this ratio, that this may vary from 1.1-5, preferably from 1.5-4 and more preferably from 1.75-3. The top of the impact element may, for instance, be manufactured from POM, PP, ABS or metal.

The diameter d4 of the opening (inlet) 10 of the nozzle may, for instance, vary from 0.3-1.5 mm, more preferably 0.6-1.0 mm and even more preferably 0.7-0.9 mm.

A greatest diameter d5 of the chamber may, for instance, be 1 to 4 times and preferably 1 to 3 times greater than the diameter d2 of the chamber at the top (see, for instance, FIG. 1). A diameter of the outflow opening 18 of the chamber may, for instance, vary from 3 to 15 mm, more preferably from 0.5 to 8 mm and even more preferably from 4 to 6 mm.

The orientation of the apparatus of FIGS. 1-8 is not relevant. Thus, the apparatus of FIG. 3 may also be tilted and even be placed upside down. Beverage supplied to the nozzle may also be understood to mean a concentrate which, after being dispensed by the apparatus, is still be diluted with water. The consumable beverage is then a concentrate still to be diluted.

Such variants are each considered to fall within the scope of the invention.

The invention claimed is:

1. An apparatus for preparing a consumable beverage with a fine-bubbled foam layer, such as coffee or milk with a fine-bubbled foam layer, comprising;
    a beverage unit for dispensing the beverage under pressure;
    at least one nozzle which is in fluid communication with the beverage unit for supplying the beverage to the nozzle for generating a jet of the beverage; and
    a collecting unit into which the jet spouts to obtain the beverage with the fine-bubbled foam layer,
    wherein the collecting unit comprises a chamber defining an inner wall and having at least one outflow opening for dispensing the beverage with the fine-bubbled foam layer and a jet impact element included in the chamber with a top, which is substantially free of the inner wall of the chamber,
    wherein the nozzle, jet impact element, and the at least one outflow opening are arranged substantially vertical relative to each other such that the jet impact element is located below the nozzle and the at least one outflow opening is located below and at least partially surrounds the jet impact element;
    wherein the nozzle and the jet impact element are positioned relative to each other such that the jet spouts against at least a part of the top of the jet impact element,
    wherein downward is directed toward the at least one outflow opening and upward is directed toward the nozzle;
    wherein the chamber is dimensioned relative to the top of the jet impact element to enable the beverage, after impact on the jet impact element, to form a mist directed upward that then flows downward against the inner wall of the chamber between the inner wall and the jet impact element and then leaves the chamber via the at least one outflow opening as the beverage with the fine-bubbled foam layer,
    wherein the at least one outflow opening for dispensing the beverage faces downwardly.

2. An apparatus according to claim 1, wherein the chamber is further provided with at least one air supply opening for supplying air to the chamber.

3. An apparatus according to claim 2, wherein the top of the jet impact element is positioned between the air supply opening and the at least one outflow opening.

4. An apparatus according to claim 3, wherein the top is directed toward the nozzle.

5. An apparatus according to claim 4, wherein the chamber is further provided with a product supply opening for supplying the jet to the chamber.

6. An apparatus according to claim 5, wherein the air supply opening and the product supply opening coincide.

7. An apparatus according to claim 6, wherein the top of the jet impact element is positioned between the product supply opening and the outflow opening.

8. An apparatus according to claim 7, wherein the top is directed toward the product supply opening.

9. An apparatus according to claim 8, wherein a surface of the top is made convex or flat.

10. An apparatus according to claim 9, wherein a normal at the middle of the surface of the top is directed substantially toward the product supply opening.

11. An apparatus according to claim 9, wherein a normal at the middle of the surface of the top is directed substantially in a longitudinal direction of the chamber.

12. An apparatus according to claim 9, wherein a normal at the middle of the surface of the top is directed substantially toward the nozzle.

13. An apparatus according to claim 12, wherein a normal from a surface of the top at a position where the jet impacts on the top is directed substantially parallel to the jet.

14. An apparatus according to claim 13, wherein a normal from a surface of the top at a position where the jet impacts on the top is directed substantially to the nozzle.

15. An apparatus according to claim 6, wherein a normal from a surface of the top at a position where the jet impacts on the top is directed substantially to the product supply opening.

16. An apparatus according to claim 15, wherein the top is positioned in a middle of the chamber.

17. An apparatus according to claim 16, wherein an axial direction of the jet impact element extends in a longitudinal direction of the chamber.

18. An apparatus according to claim 17, wherein the jet impact element is connected with the chamber by at least one cross arm.

19. An apparatus according to claim 18, wherein the inner wall of the chamber is made at least substantially rotation symmetrical.

20. An apparatus according to claim 19, wherein the inner wall of the chamber is made at least substantially rotation symmetrical about a rotation axis which extends in the longitudinal direction of the chamber.

21. An apparatus according to claim 20, wherein the rotation axis extends through the top.

22. An apparatus according to claim 21, wherein the inner wall of the chamber is made at least partly cylindrical.

23. An apparatus according to claim 22, wherein the jet, after impact on the jet impact element, forms a mist of the beverage which flows against and/or along the inner wall of the chamber and then leaves the chamber via the at least one outflow opening as the beverage with the fine-bubbled foam layer.

24. A unit comprising a collecting unit and a nozzle of the apparatus according to claim 23 and a container for receiving a pad which comprises an envelope of filtering paper and which, for instance, is filled with a product to be extracted, such as ground coffee, whereby the container and the collecting unit are mechanically connected with each other and whereby the container comprises at least one outlet which is in fluid communication with an inlet of the nozzle.

25. A unit according to claim 24, wherein the container comprises a bottom and an upright side wall which extends around the bottom.

26. An assembly of a unit according to claim 25 and a pad which comprises an envelope of filtering paper and which is filled with a product to be extracted, such as ground coffee, whereby the pad is received in the container and thereby extends over a bottom of the container to upright side walls of the container.

27. An apparatus according to claim 1, wherein the inner wall of the chamber has opposite sections facing a perimeter edge of the top of the jet impact element in at least one diametrical direction that are spaced from one another at less than five times an extent of the top between confronting opposite sections of the perimeter edge of the top of the jet impact element in the same diametrical direction.

28. An apparatus according to claim 1, wherein the jet impact element is substantially horizontal to direct the mist upward and toward the inner wall of the chamber after impacting the top of the jet impact element.

29. An apparatus according to claim 1, wherein the chamber comprises a product supply opening for supplying air and the beverage jet to the chamber, wherein the jet impact element is positioned directly between the product supply opening and the outflow opening.

30. An apparatus according to claim 29, wherein the distance (H1) from the product supply opening to the top of the jet impact element is greater than the distance (H2) from the top of the jet impact element to the outflow opening.

31. A method for preparing a consumable beverage with a fine-bubbled foam layer, such as coffee or milk, comprising:
providing a collecting unit having a chamber and a jet impact element located in the chamber vertically below a nozzle, the chamber defining an inner wall having at least one downwardly-facing outflow opening vertically below the jet impact element, the jet impact element having a substantially horizontally extending convex top surface that is spaced apart from the inner wall of the chamber, the at least one outflow opening substantially surrounding the jet impact element, wherein downward is directed toward the at least one outflow opening and upward is directed toward the nozzle;
supplying the beverage to the nozzle;
generating a liquid jet which comprises the beverage; and
supplying the liquid jet to the collecting unit so that the jet spouts into the collecting unit to obtain the beverage with the fine-bubbled foam layer;
directing the jet against the convex top surface of the jet impact element so that the beverage, after impact on the jet impact element, forms a mist that travels upward and sideward and then flows downward against the inner wall of the chamber and then;
dispensing the beverage with the fine-bubbled foam layer downwardly from the chamber between the inner wall and the jet impact element via the at least one outflow opening.

32. A method according to claim 31, wherein air is supplied to the chamber.

33. A method according to claim 32, wherein the collecting unit comprises at least one air supply opening for supplying air to the chamber.

34. A method according to claim 33, wherein the chamber further comprises a product supply opening via which the jet is supplied to the chamber.

35. A method according to claim 33, wherein the product supply opening and the air supply opening coincide.

36. A method according to claim 35, wherein the top of the jet impact element is positioned between the product supply opening and the outflow opening.

37. A method according to claim 36, wherein the jet is directed on top of the top.

38. A method according to claim 37, wherein the jet is directed such that a normal from the surface of the top at a position where the jet impacts on the top is substantially parallel to the direction of the jet at the top.

39. A method according to claim 36, wherein the jet is directed such that a normal from the surface of the top at a position where the jet impacts on the top is directed substantially to the product supply opening.

40. A method according to claim 39, wherein a surface of the top is made convex or flat.

41. A method according to claim 40, wherein a normal at the middle of the surface of the top is directed substantially toward the product supply opening.

42. A method according to claim 39, wherein a normal at the middle of the surface of the top is directed substantially in a longitudinal direction of the chamber.

43. A method according to claim 40, wherein a normal at the middle of the surface of the top is directed substantially parallel to the jet.

44. A method according to claim 43, wherein the top is positioned in a middle of the chamber.

45. A method according to claim 44, wherein an axial direction of the jet impact element extends in a longitudinal direction of the chamber.

46. A method according to claim 45, wherein the jet impact element is connected with the chamber by means of at least one cross arm.

47. A method according to claim 46, wherein the inner wall of the chamber is made at least substantially rotation symmetrical.

48. A method according to claim 47, wherein the inner wall of the chamber is made at least substantially rotation symmetrical around a rotation axis which extends in the longitudinal direction of the chamber.

49. A method according to claim 48, wherein the rotation axis extends through the top.

50. A method according to claim 49, wherein the inner wall of the chamber is made at least partly cylindrical.

51. A method according to claim 50, wherein the jet of beverage is generated by supplying the beverage under pressure to a nozzle.

52. A method according to claim 51, wherein the air supply opening is positioned between the nozzle and the top of the jet impact element.

53. A method according to claim 52, wherein the jet, after impact on the impact element, forms a mist of the beverage which flows against and/or along the inner wall and then leaves the chamber via the at least one outflow opening as the beverage with the fine-bubbled foam layer.

54. A method according to claim 31, further comprising directing the mist upward and toward the inner wall of the chamber after impacting the jet impact element.

* * * * *

UNITED STATES PATENT AND TRADEMARK OFFICE
CERTIFICATE OF CORRECTION

| | |
|---|---|
| PATENT NO. | : 7,748,311 B2 |
| APPLICATION NO. | : 11/013242 |
| DATED | : July 6, 2010 |
| INVENTOR(S) | : Gustaaf Frans Brouwer and Antonius Cornelis Hubertus van der Pluijim |

It is certified that error appears in the above-identified patent and that said Letters Patent is hereby corrected as shown below:

<u>ON THE COVER OF THE PATENT ITEM (75),</u>

The second inventor name should be: <u>Antonius Cornelis Hubertus van der Pluijim</u>

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,748,311 B2
APPLICATION NO. : 11/013242
DATED : July 6, 2010
INVENTOR(S) : Gustaaf Frans Brouwer and Antonius Cornelis Hubertus van der Pluijm It is certified that error appears in the above-identified patent and that said Letters Patent is hereby corrected as shown below:

ON THE COVER OF THE PATENT ITEM (75),

The second inventor name should be: Antonius Cornelis Hubertus van der Pluijm

This certificate supersedes the Certificate of Correction issued July 12, 2011.

Signed and Sealed this
Second Day of October, 2012

David J. Kappos
*Director of the United States Patent and Trademark Office*